(12) United States Patent
Tsai

(10) Patent No.: US 11,506,965 B1
(45) Date of Patent: Nov. 22, 2022

(54) ILLUMINATION SYSTEM AND PROJECTION DEVICE

(71) Applicant: Coretronic Corporation, Hsin-Chu (TW)

(72) Inventor: Pei-Chun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/729,001

(22) Filed: Apr. 26, 2022

(30) Foreign Application Priority Data

Apr. 29, 2021 (CN) .......................... 202120909620.2

(51) Int. Cl.
  *G03B 21/20* (2006.01)
  *G02B 26/00* (2006.01)
(52) U.S. Cl.
  CPC ......... *G03B 21/204* (2013.01); *G02B 26/008* (2013.01); *G03B 21/208* (2013.01); *G03B 21/2033* (2013.01); *G03B 21/2066* (2013.01)
(58) Field of Classification Search
  CPC . G03B 21/204; G03B 21/2066; G02B 26/008
  See application file for complete search history.

(56) References Cited

U.S. PATENT DOCUMENTS

| | | | | |
|---|---|---|---|---|
| 2015/0267880 | A1* | 9/2015 | Hadrath | F21K 9/64 362/84 |
| 2015/0316840 | A1* | 11/2015 | Maeda | F21K 9/64 353/31 |
| 2017/0242241 | A1* | 8/2017 | Nojima | G03B 21/204 |
| 2018/0046069 | A1* | 2/2018 | Kang | G02B 27/0961 |
| 2019/0235370 | A1* | 8/2019 | Weng | G03B 21/2006 |
| 2019/0249833 | A1* | 8/2019 | Hsu | G03B 21/204 |
| 2020/0026171 | A1* | 1/2020 | Hsieh | B32B 7/12 |
| 2020/0257187 | A1* | 8/2020 | Bartlett | H04N 9/3188 |

FOREIGN PATENT DOCUMENTS

| | | |
|---|---|---|
| CN | 104820334 | 8/2015 |
| CN | 105676578 | 9/2017 |
| CN | 111208698 | 5/2020 |
| CN | 111897183 | 11/2020 |

* cited by examiner

*Primary Examiner* — William N Harris
(74) *Attorney, Agent, or Firm* — JCIPRNET

(57) ABSTRACT

An illumination system providing an illumination light beam is provided. The excitation light beam passes beside a central region from a first side of the wavelength conversion wheel and then exits from a second side and is transmitted to the first mirror. The first mirror reflects the excitation light beam to the central region on the second side. A non-conversion reflection region of the wavelength conversion wheel reflects the excitation light beam, or a wavelength conversion reflection region of the wavelength conversion wheel converts the excitation light beam into a converted light beam and reflects the converted light beam. The excitation light beam or the converted light beam that is reflected is transmitted to the light homogenizing element. The light homogenizing element homogenizes the excitation light beam and the converted light beam to form the illumination light beam. A projection device is proposed, too.

20 Claims, 5 Drawing Sheets

ILLUMINATION SYSTEM AND PROJECTION DEVICE

CROSS-REFERENCE TO RELATED APPLICATION

This application claims the priority benefit of China application serial no. 202120909620.2, filed on Apr. 29, 2021. The entirety of the above-mentioned patent application is hereby incorporated by reference herein and made a part of this specification.

BACKGROUND

Technical Field

The invention relates to an optical system and an optical device, and in particular to an illumination system and a projection device.

Description of Related Art

A conventional laser projector uses a laser light source module to generate excitation light. Different color lights are generated from the excitation light transmitted by a phosphor wheel and a filter wheel in different time sequences, and then passes through a light homogenizing element to homogenize the light to be uniformly shaped. Finally, the gray scale of an image is controlled by a light valve, and then the image is projected through a projection lens set. A blue excitation light emitted from the light source module is focused on the rotating phosphor wheel by an optical element. When the blue excitation light hits the phosphor, the yellow light is excited and reflected and then incident into the light homogenizing element. Alternatively, the blue excitation light passes through a hole of the phosphor wheel, and then is incident into the light homogenizing element by the optical element.

However, too many optical elements are required to form the above-mentioned structure, thereby resulting in a large accumulated tolerance of the structure, difficulties and poor accuracy when assembling the projector. In addition, using too many optical elements makes it difficult to reduce the size of the system.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an illumination system and a projection device which reduce the number of optical elements required.

An embodiment of the disclosure provides an illumination system configured to provide an illumination light beam. The illumination system includes an excitation light source, a first mirror, a wavelength conversion wheel, and a light homogenizing element. The excitation light source is configured to emit an excitation light beam. The wavelength conversion wheel includes a wavelength conversion reflection region and a non-conversion reflection region. The wavelength conversion reflection region and the non-conversion reflection region are located in a central region of the wavelength conversion wheel, and the wavelength conversion wheel includes a first side and a second side that are opposite to each other. The excitation light beam passes through an area beside the central region from the first side of the wavelength conversion wheel and then exits from the second side of the wavelength conversion wheel and is transmitted to the first mirror. The first mirror is configured to reflect the excitation light beam to the central region on the second side. The non-conversion reflection region is configured to reflect the excitation light beam, or the wavelength conversion reflection region is configured to convert the excitation light beam into a converted light beam and reflect the converted light beam. The excitation light beam that is reflected or the converted light beam that is reflected is transmitted to the light homogenizing element. The light homogenizing element is configured to homogenize the excitation light beam and the converted light beam to form the illumination light beam.

An embodiment of the disclosure provides a projection device including an illumination system, a light valve, and a projection lens. The illumination system is configured to provide an illumination light beam. The light valve is disposed on a transmission path of the illumination light beam to convert the illumination light beam into an image beam. The projection lens is disposed on a transmission path of the image beam to project the image beam out of the projection device. The illumination system includes an excitation light source, a first mirror, a wavelength conversion wheel, and a light homogenizing element. The excitation light source is configured to emit an excitation light beam. The wavelength conversion wheel includes a wavelength conversion reflection region and a non-conversion reflection region. The wavelength conversion reflection region and the non-conversion reflection region are located in a central region of the wavelength conversion wheel, and the wavelength conversion wheel includes a first side and a second side that are opposite to each other. The excitation light beam passes through an area beside the central region from the first side of the wavelength conversion wheel and then exits from the second side of the wavelength conversion wheel to be transmitted to the first mirror. The first mirror is configured to reflect the excitation light beam to the central region located on the second side. The non-conversion reflection region is configured to reflect the excitation light beam, or the wavelength conversion reflection region is configured to convert the excitation light beam into a converted light beam and reflect the converted light beam. The excitation light beam that is reflected or the converted light beam that is reflected is transmitted to the light homogenizing element. The light homogenizing element is configured to homogenize the excitation light beam and the converted light beam to form the illumination light beam.

Based on the above, in an embodiment of the disclosure, since the light path of the excitation light beam is designed to allow the excitation light beam to be transmitted to the wavelength conversion wheel twice and be transmitted to the light homogenizing element or to be transmitted to the wavelength conversion wheel twice and be converted into the converted light beam and then be transmitted to the light homogenizing element, the number of optical elements required in the illumination system or the projection device is reduced, thereby achieving easier system assembly, increased accuracy, and reduction in the volume of the system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIG.(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" Component is directly "adjacent to" "B" component or one or more additional components are between "A" component and "B" component. Accordingly, the drawings and descriptions will be regarded as illustrative in nature and not as restrictive.

Figure 1A:
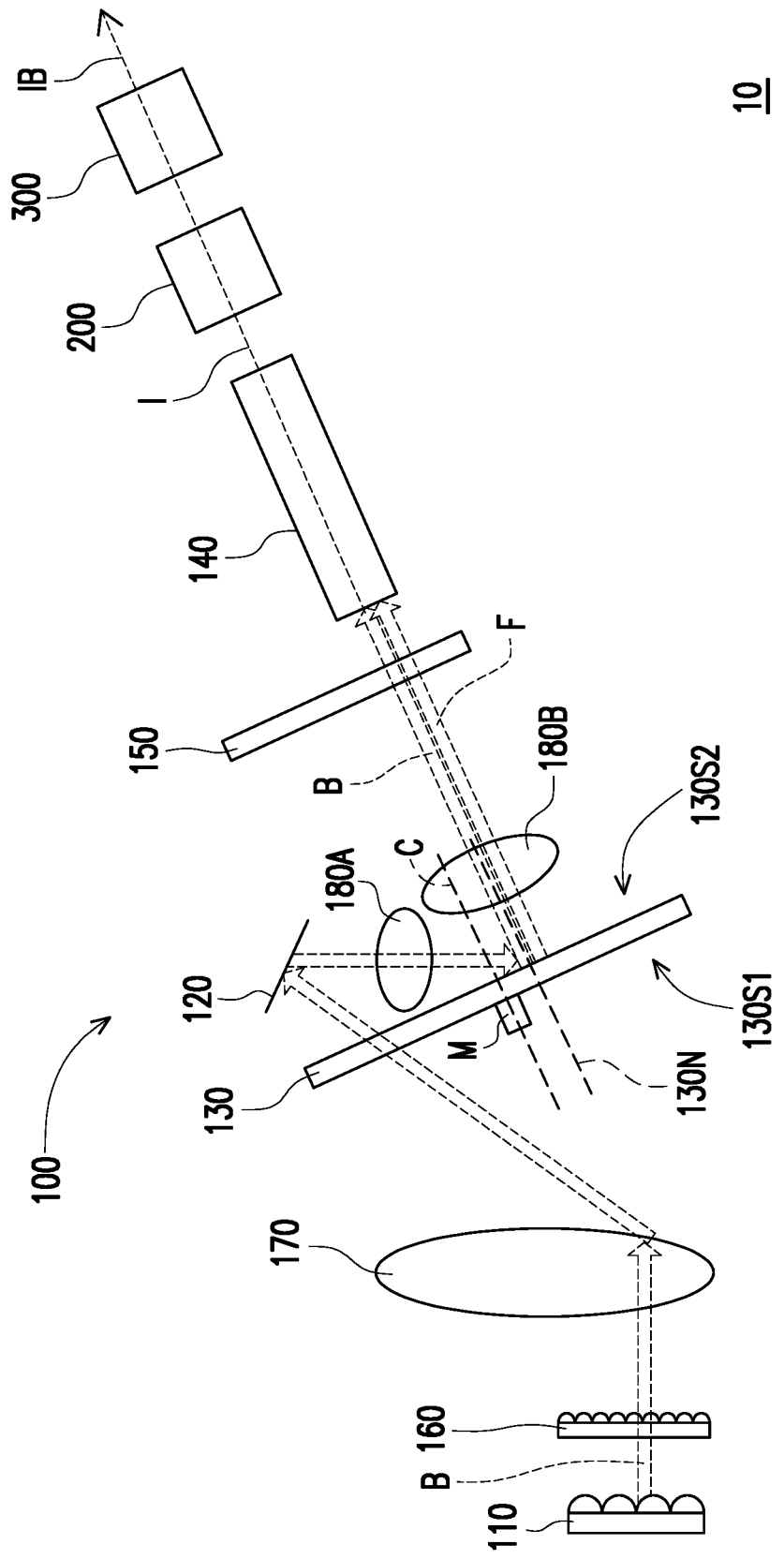
FIG. 1A is a schematic view of a projection device according to the first embodiment of the invention.

FIG. 1A is a schematic view of a projection device according to the first embodiment of the invention. Referring to FIG. 1A, an embodiment of the invention provides a projection device 10 including an illumination system 100, a light valve 200, and a projection lens 300. The illumination system 100 is used to provide an illumination light beam I. The light valve 200 is disposed on the transmission path of the illumination light beam I to convert the illumination light beam I into an image beam IB. The projection lens 300 is disposed on the transmission path of the image beam IB to project the image beam IB out of the projection device 10.

Specifically, the light valve 200 of this embodiment is, for example, a spatial light modulator such as a digital micromirror device (DMD), a liquid-crystal-on-silicon panel (LCOS Panel), or a liquid crystal panel (LCD). In addition, the projection lens 300 is, for example, a combination including one or more optical lenses with a diopter. The optical lenses include, for example, various combinations of non-planar lenses including biconcave lens, biconvex lens, concave-convex lens, convex-concave lens, plano-convex lens, and plano-concave lens. The invention does not limit the form and type of the projection lens 300.

In this embodiment, the illumination system 100 includes an excitation light source 110, a first mirror 120, a wavelength conversion wheel 130, and a light homogenizing element 140. The excitation light source 110 is used to emit an excitation light beam B. The excitation light source 110 is, for example, a laser diode (LD), a light emitting diode (LED), or other suitable light sources or a combination thereof, and the invention is not limited thereto. In addition, the excitation light beam B may be a beam of blue light, red light, green light or other light colors. The light homogenizing element 140 is, for example, an integration rod, a lens array, or other optical elements with a light uniformization effect, but the invention is not limited thereto. In this embodiment, the illumination system 100 may further include a filter wheel 150, and the filter wheel 150 is disposed between the wavelength conversion wheel 130 and the light homogenizing element 140.

Figure 1B:
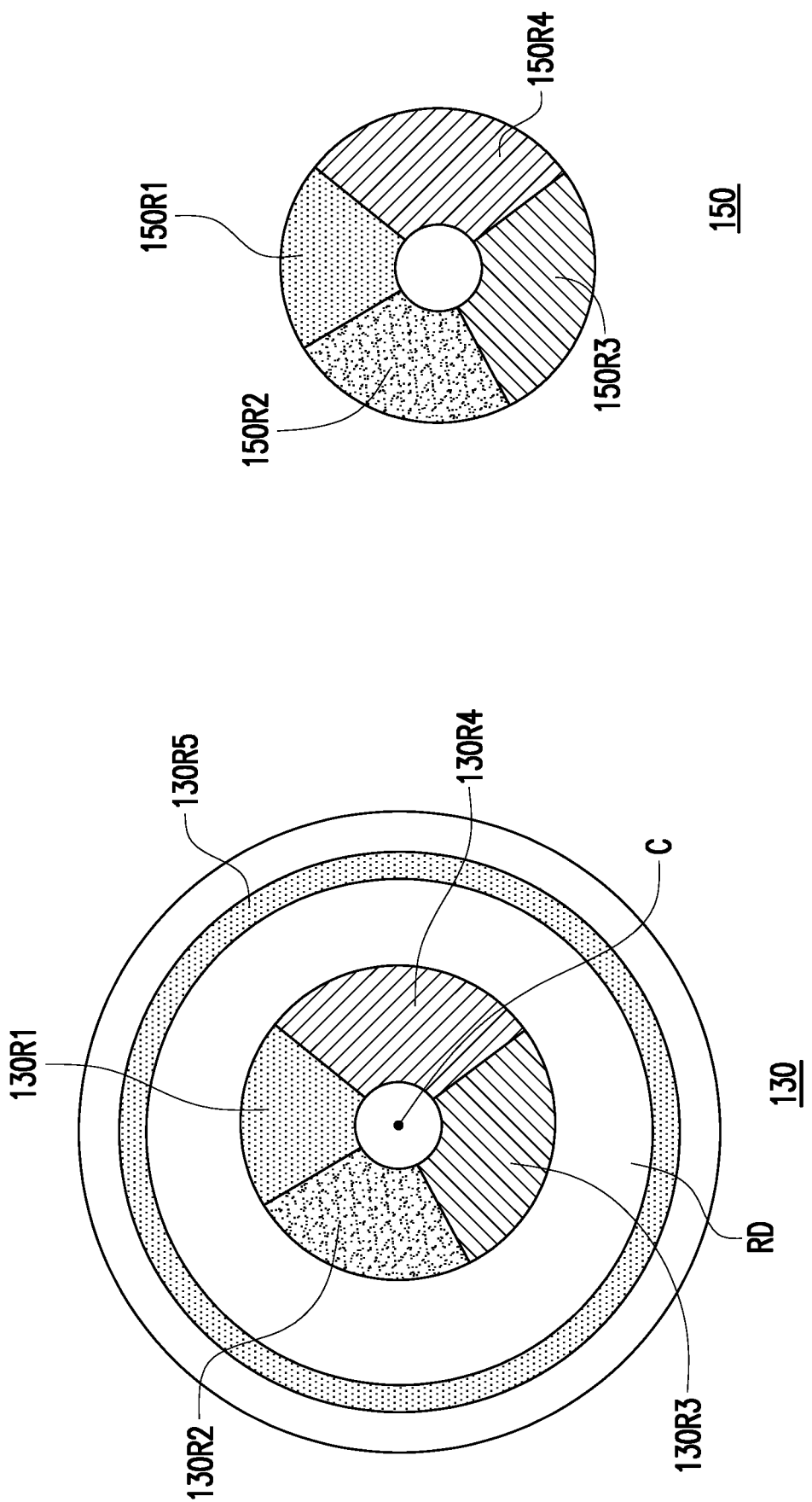
FIG. 1B is a schematic view of a wavelength conversion wheel and a filter wheel in FIG. 1A.

FIG. 1B is a schematic view of a wavelength conversion wheel and a filter wheel in FIG. 1A. Referring to FIGS. 1A and 1B, in this embodiment, the wavelength conversion wheel 130 includes wavelength conversion reflection regions 130R2, 130R3, and 130R4, and a non-conversion reflection region 130R1. The wavelength conversion reflection regions 130R2, 130R3, and 130R4 and the non-conversion reflection region 130R1 are adjacently disposed in the central region of the wavelength conversion wheel 130, and the wavelength conversion wheel 130 includes a first side 130S1 and a second side 130S2 that are opposite to each other. The excitation light beam B passes through an area beside the central region from the first side 130S1 of the wavelength conversion wheel 130, and then exits from the second side 130S2 of the wavelength conversion wheel 130 and is transmitted to the first mirror 120. The first mirror 120 reflects the excitation light beam B to the central region located on the second side 130S2 of the wavelength conversion wheel 130. The wavelength conversion wheel 130 of this embodiment includes a rotary disc RD and a drive element M, and the drive element M is, for example, a motor, and is connected to the rotary disc RD to drive the rotary disc RD to rotate about a center axis C thereof. In this way, the wavelength conversion reflection regions 130R2, 130R3, and 130R4 and the non-conversion reflection region 130R1 may alternately cut into the transmission path of the excitation light beam B reflected by the first mirror 120. When the non-conversion reflection region 130R1 cuts into the transmission path of the excitation light beam B, the non-conversion reflection region 130R1 reflects the excitation light beam B, or when any one of the wavelength conversion reflection regions 130R2, 130R3, and 130R4 cuts into the transmission path of the excitation light beam B, a corresponding wavelength conversion reflection region 130R2, 130R3, and 130R4 converts the excitation light beam B into a converted light beam F and reflects the converted light beam F. In this embodiment, the rotary disc RD is, for example, a metal rotary disc, and the excitation light beam B incident to the wavelength conversion reflection regions 130R2, 130R3, and 130R4 and the non-conversion reflection region 130R1 or the converted light beam F that is converted may be reflected by the rotary disc RD, or the position (that is, the central region) of the rotary disc corresponding to the wavelength conversion reflection regions 130R2, 130R3, and 130R4 and the non-conversion reflection region 130R1 may be coated with a reflective layer (not shown), which is used to reflect the excitation light beam B or the converted light beam F. The excitation light beam B or the converted light beam F is then transmitted to the light homogenizing element 140. The light homogenizing element 140 homogenizes the excitation light beam B and the converted light beam F to form the illumination light beam I. In addition, in this embodiment, the central region of the wavelength conversion wheel 130 is, for example, the region around the center axis C of the rotary disc RD; that is, the wavelength conversion reflection regions 130R2, 130R3, and 130R4 and the non-conversion reflection region 130R1 are disposed around the center axis C of the rotary disc RD.

Take a blue beam as the excitation light beam B as an example. The converted light beam F may be red light, green light, yellow light, or a combination thereof. The different wavelength conversion reflection regions 130R2, 130R3, and 130R4 may convert the excitation light beam B into beams of different light colors and then allow the beams to be reflected.

In this embodiment, the second side 130S2 of the wavelength conversion wheel 130 faces the light homogenizing element 140.

In this embodiment, the wavelength conversion wheel 130 further includes an excitation light beam penetrating region 130R5. The excitation light beam penetrating region 130R5 is disposed to surround the periphery of the central region; that is, a radial distance of the excitation light beam penetrating region 130R5 on the rotary disc RD relative to the center axis C is greater than a radial distance of the central region (the wavelength conversion reflection regions 130R2, 130R3, and 130R4 and the non-conversion reflection region 130R1) on the rotary disc RD relative to the center axis C. The excitation light beam B from the excitation light source 110 is transmitted to the first side 130S1 of the wavelength conversion wheel 130, passes through the excitation light beam penetrating region 130R5 from the first side 130S1 of the wavelength conversion wheel 130, and then exits from the second side 130S2 of the wavelength conversion wheel 130 and is then transmitted to the first mirror 120.

In an embodiment, the excitation light beam penetrating region 130R5 is a hollow region (for example, an air layer without any elements disposed) or a filter or a filter glass with an excitation light beam transmittance greater than or equal to 90%. Specifically, if the excitation light beam penetrating region 130R5 is disposed with a filter or a filter glass, the inner edge of the filter or filter glass may be, for example, connected to the outer edge of the rotary disc RD, or if the rotary disc RD is a translucent material, the filter is disposed on the surface on one side of the rotary disc RD and surrounds the periphery of the central region.

In this embodiment, the non-conversion reflection region 130R1 and the wavelength conversion reflection regions 130R2, 130R3, and 130R4 alternately cut into the transmission path of the excitation light beam B from the first mirror 120. In a first time sequence, the non-conversion reflection region 130R1 cuts into the transmission path of the excitation light beam B, and the excitation light beam B is reflected by the non-conversion reflection region 130R1 and then to be transmitted to the light homogenizing element 140. In a second time sequence, the wavelength conversion reflection regions 130R2, 130R3, and 130R4 cut into the transmission path of the excitation light beam B to convert the excitation light beam B into the converted light beam F, and the converted light beam F reflected by the wavelength conversion reflection regions 130R2, 130R3, and 130R4 is then transmitted to the light homogenizing element 140.

In an embodiment, the light path of the excitation light beam B between the wavelength conversion wheel 130 and the light homogenizing element 140 and the light path of the converted light beam F between the wavelength conversion wheel 130 and the light homogenizing element 140 substantially overlap, so the uniformity of light spots of each color light of the illumination light beam I of the illumination system 100 is better, and thus the imaging uniformity of the projection device 10 is better.

In this embodiment, the filter wheel 150 includes an excitation light beam filter region 150R1 and converted light beam filter regions 150R2, 150R3, and 150R4. The excitation light beam filter region 150R1 is configured to allow the excitation light beam B to pass through and to filter the light beams of other light colors. The converted light beam filter regions 150R2, 150R3, and 150R4 are configured to allow the converted light beams F of different light colors to respectively pass through and to filter the light beams of other light colors. The excitation light beam filter region 150R1 corresponds to the non-conversion reflection region 130R1, and the converted light beam filter regions 150R2, 150R3, and 150R4 may respectively correspond the wavelength conversion reflection regions 130R2, 130R3, and 130R4.

In the first time sequence of this embodiment, the excitation light beam filter region 150R1 cuts into the transmission path of the excitation light beam B. The excitation light beam B reflected by the non-conversion reflection region 130R1 first penetrates the excitation light beam filter region 150R1 of the filter wheel 150 and then is transmitted to the light homogenizing element 140. In the second time sequence, the converted light beam filter regions 150R2, 150R3, and 150R4 cut into the transmission path of the converted light beam F sequentially. The converted light beam F reflected by the wavelength conversion reflection regions 130R2, 130R3, and 130R4 first correspondingly penetrate the converted light beam filter regions 150R2, 150R3, and 150R4 of the filter wheel 150 sequentially, and then is transmitted to the light homogenizing element 140.

In this embodiment, the filter wheel 150 and the wavelength conversion wheel 130 are substantially parallel to each other.

In this embodiment, the illumination system 100 further includes a light deflecting element 170. The light deflecting element 170 is disposed between the excitation light source 110 and the wavelength conversion wheel 130. The light deflecting element 170 is, for example, a lens set for refracting the excitation light beam B from the excitation light source 110 to the wavelength conversion wheel 130, thereby changing the transmission direction of the excitation light beam B. The excitation light beam B emitted from the excitation light source 110 is first transmitted to the light deflecting element 170, and then is deflected by the light deflecting element 170 and is transmitted to the central region of the wavelength conversion wheel 130.

In this embodiment, the transmission direction of the excitation light beam B between the excitation light source 110 and the light deflecting element 170 is neither perpendicular nor parallel to a normal line 130N of a disc surface of the rotary disc RD of the wavelength conversion wheel 130.

In this embodiment, the orthographic projection of the excitation light source 110 on the disc surface of the wavelength conversion wheel 130 along the direction of the normal line 130N of the wavelength conversion wheel 130 at least partially overlaps the rotary disc RD of the wavelength conversion wheel 130.

In this embodiment, the illumination system 100 further includes lens sets 160, 180A, and 180B. The lens sets 160, 180A, and 180B are used to expand, contract, and collimate a beam or to modulate light spots of the beam. The lens set 160 is disposed between the excitation light source 110 and the light deflecting element 170, and the lens set 160 may be, for example, a fly-eye lens. On the transmission path of the excitation light beam B, the lens set 180A is disposed between the first mirror 120 and the wavelength conversion wheel 130. On the transmission path of the excitation light beam B or the converted light beam F, the lens set 180B is disposed between the wavelength conversion wheel 130 and the filter wheel 150.

In another embodiment, the lens sets 180A and 180B may be combined into one lens set, too. In other words, the excitation light beam B reflected from the first mirror 120 that is transmitted to the wavelength conversion wheel 130, and the excitation light beam B and the converted light beam F reflected by the wavelength conversion wheel 130 all pass through the one lens set.

Based on the above, in an embodiment of the invention, since the wavelength conversion wheel 130 includes the wavelength conversion reflection regions 130R2, 130R3, and 130R4 and the non-conversion reflection region 130R1, and the light path of the excitation light beam B is designed to allow the excitation light beam B to be transmitted to the wavelength conversion wheel 130 twice and to be transmitted to the light homogenizing element 140 later, or to be transmitted to the wavelength conversion wheel 130 twice and be converted into the converted light beam F and then to be transmitted to the light homogenizing element 140, the number of optical elements required in the illumination system 100 or the projection device 10 is reduced, thereby achieving easier system assembly and increased accuracy.

Moreover, since the light source usually needs to be connected to a heat-dissipation module with a large area, in the case where the excitation light source 110 and the light homogenizing element 140 are respectively disposed on two opposite sides of the wavelength conversion wheel 130, the optical elements in the illumination system 100 are roughly disposed in a straight line, thereby facilitates the reduction of the height, width, or volume of the system.

Figure 2:
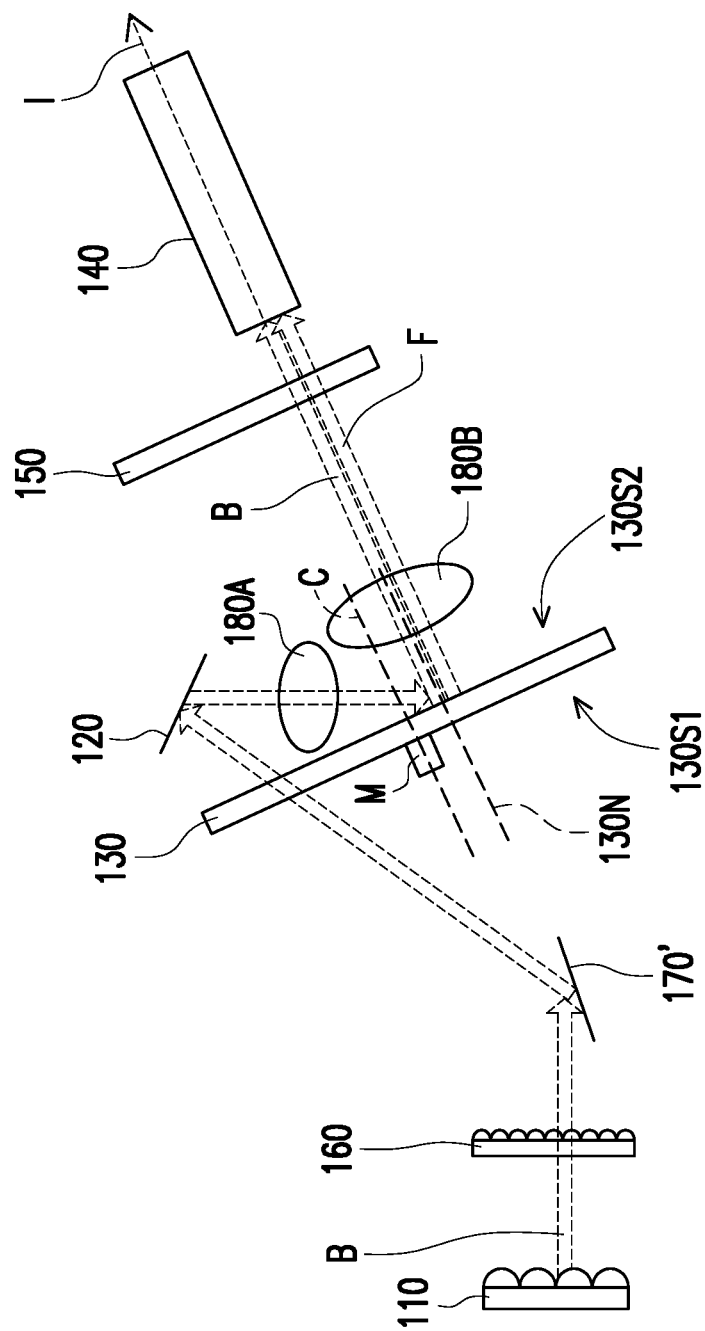
FIG. 2 is a schematic view of an illumination system according to the second embodiment of the invention.

FIG. 2 is a schematic view of an illumination system according to the second embodiment of the disclosure. Referring to FIG. 2, an illumination system 100' of FIG. 2 is similar to the illumination system 100 of FIG. 1, and the main differences are as follows. In this embodiment, a light deflecting element 170' may be a mirror or a curved lens, which is configured to refract the excitation light beam B from the excitation light source 110 and allow the excitation light beam B to pass through the area beside the central region of the wavelength conversion wheel 130, thereby reducing the cost. The advantage of the illumination system 100' is similar to that of the illumination system 100, so details thereof will be omitted herein.

Figure 3A:
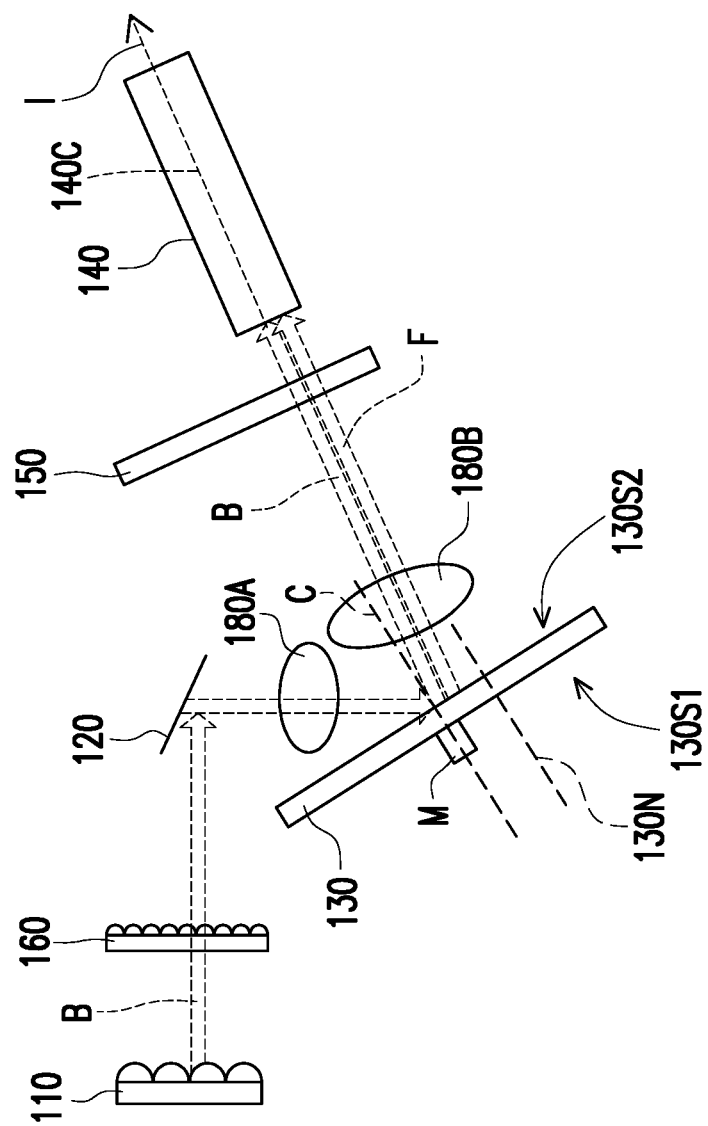
FIG. 3A is a schematic view of an illumination system according to the third embodiment of the invention.
Figure 3B:
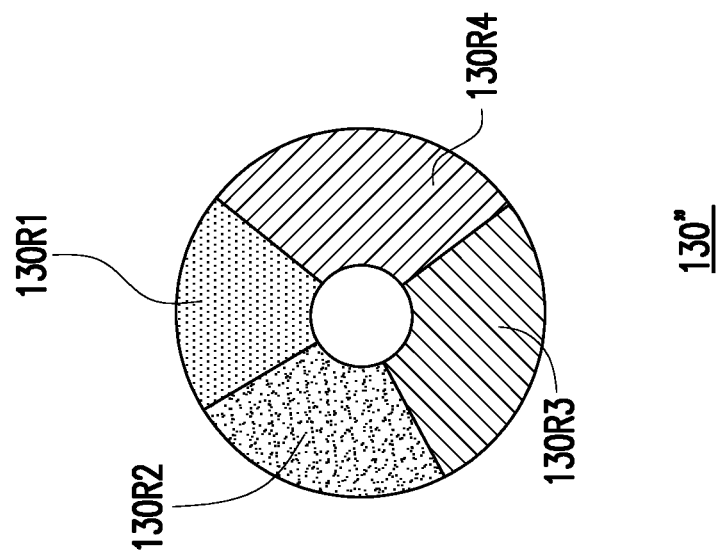
FIG. 3B is a schematic view of a wavelength conversion wheel in FIG. 3A.

FIG. 3A is a schematic view of an illumination system according to the third embodiment of the invention. FIG. 3B is a schematic view of a wavelength conversion wheel in FIG. 3A. Referring to FIGS. 3A and 3B, an illumination system 100" in FIG. 3A is similar to the illumination system 100 in FIG. 1, and the main differences are as follows. The illumination system 100" is not disposed with a light deflecting element. The excitation light beam B from the excitation light source 110 is directly transmitted from the first side 130S1 of the wavelength conversion wheel 130 to the first mirror 120, and the first mirror 120 reflects the excitation light beam B to the central region located on the second side 130S2 of the wavelength conversion wheel 130. In addition, in this embodiment, a center axis 140C of the light homogenizing element 140 and the normal line 130N of the disc surface of the wavelength conversion wheel 130 are neither perpendicular nor parallel to each other. The filter wheel 150 and the wavelength conversion wheel 130 are not parallel to each other. However, in another embodiment, the center axis 140C of the light homogenizing element 140 may be designed to be parallel to the normal line 130N of the disc surface of the wavelength conversion wheel 130, and the filter wheel 150 and the wavelength conversion wheel 130 are parallel to each other.

In addition, the excitation light beam penetrating region 130R5 of the wavelength conversion wheel 130 in FIG. 1B is omitted in a wavelength conversion wheel 130" of the illumination system 100" in FIG. 3B; that is, the region penetrated by the excitation light beam does not have any elements disposed, so that the excitation light beam B from the excitation light source 110 passes beside the wavelength conversion wheel 130 from the first side 130S1 of the wavelength conversion wheel 130, and is transmitted directly to the first mirror 120. The excitation light beam B reflected by the first mirror 120 is incident on the non-conversion reflection region 130R1 and the wavelength conversion reflection regions 130R2, 130R3, and 130R4 in different time sequences. The design of the wavelength conversion wheel 130" of this embodiment reduces the cost of the illumination system 100" and reduces the space required in the system. Moreover, the light deflecting element 170 of FIG. 1A or the light deflecting element 170' of FIG. 2 is omitted in the illumination system 100", so that the cost may be further reduced. The other advantages of the illumination system 100 are similar to those of the illumination system 100, so details thereof will be omitted herein.

In summary, in an embodiment of the invention, since the wavelength conversion wheel includes the wavelength conversion reflection regions and the non-conversion reflection region, and the light path of the excitation light beam is designed to allow the excitation light beam to be transmitted to the wavelength conversion wheel twice and to be transmitted to the light homogenizing element or to be transmitted to the wavelength conversion wheel twice and be converted into the converted light beam and then to be transmitted to the light homogenizing element, the number of optical elements required in the illumination system or the projection device is reduced, thereby achieving easier system assembly, increased accuracy, and reduction in the volume of the system.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam, wherein the illumination system comprises an excitation light source, a first mirror, a wavelength conversion wheel, and a light homogenizing element, wherein:
    the excitation light source is configured to emit an excitation light beam;
    the wavelength conversion wheel comprises a wavelength conversion reflection region and a non-conversion reflection region, the wavelength conversion reflection region and the non-conversion reflection region are located in a central region of the wavelength conversion wheel, and the wavelength conversion wheel comprises a first side and a second side that are opposite to each other;
    the excitation light beam passes through an area beside the central region from the first side of the wavelength conversion wheel and then exits from the second side of the wavelength conversion wheel and is transmitted to the first mirror, and the first mirror is configured to reflect the excitation light beam to the central region on the second side; and
    the non-conversion reflection region is configured to reflect the excitation light beam, or the wavelength conversion reflection region is configured to convert the excitation light into a converted light beam and reflect the converted light beam, the excitation light beam that is reflected or the converted light beam that is reflected is transmitted to the light homogenizing element, and the light homogenizing element is configured to homogenize the excitation light beam and the converted light beam to form the illumination light beam.

2. The illumination system according to claim 1, wherein the second side of the wavelength conversion wheel faces the light homogenizing element.

3. The illumination system according to claim 1, wherein the wavelength conversion wheel further comprises an excitation light beam penetrating region disposed to surround a periphery of the central region, wherein the excitation light beam passes through the excitation light beam penetrating region from the first side of the wavelength conversion wheel and then exits from the second side to be transmitted to the first mirror.

4. The illumination system according to claim 3, wherein the excitation light beam penetrating region is a hollow region or is disposed with a filter or a filter glass with an excitation light beam transmittance greater than or equal to 90%.

5. The illumination system according to claim 1, wherein the non-conversion reflection region and the wavelength conversion reflection region alternately cut into a transmission path of the excitation light beam from the first mirror, wherein:
    in a first time sequence, the non-conversion reflection region cuts into the transmission path of the excitation light beam and reflects the excitation light beam to the light homogenizing element; and
    in a second time sequence, the wavelength conversion reflection region cuts into the transmission path of the excitation light beam, converts the excitation light beam into the converted light beam, and reflect the converted light beam to the light homogenizing element.

6. The illumination system according to claim 1, wherein the illumination system further comprises a filter wheel, and the filter wheel comprises an excitation light beam filter region and a converted light beam filter region, wherein:
    in a first time sequence, the excitation light beam filter region cuts into a transmission path of the excitation light beam, and the excitation light beam reflected by the non-conversion reflection region first penetrates the excitation light beam filter region and then is transmitted to the light homogenizing element; and
    in a second time sequence, the converted light beam filter region cuts into a transmission path of the converted light beam, and the converted light beam reflected by the wavelength conversion reflection region first penetrates the converted light beam filter region and then is transmitted to the light homogenizing element.

7. The illumination system according to claim 1, wherein the illumination system further comprises a light deflecting element, and the excitation light beam emitted from the excitation light source is first transmitted to the light deflecting element and then is transmitted to the area beside the central region of the wavelength conversion wheel.

8. The illumination system according to claim 7, wherein the light deflecting element is a mirror or a curved lens.

9. The illumination system according to claim 7, wherein a transmission direction of the excitation light beam between the excitation light source and the light deflecting element is neither perpendicular nor parallel to a normal line of a disc surface of the wavelength conversion wheel.

10. The illumination system according to claim 1, wherein a center axis of the light homogenizing element is neither perpendicular nor parallel to a normal line of a disc surface of the wavelength conversion wheel.

11. A projection device, wherein the projection device comprises an illumination system, a light valve, and a projection lens, wherein the illumination system is configured to provide an illumination light beam, the light valve is disposed on a transmission path of the illumination light beam to convert the illumination light beam into an image beam, and the projection lens is disposed on a transmission path of the image beam to project the image beam out of the projection device; wherein the illumination system comprises an excitation light source, a first mirror, a wavelength conversion wheel, and a light homogenizing element, wherein:
the excitation light source is configured to emit an excitation light beam;
the wavelength conversion wheel comprises a wavelength conversion reflection region and a non-conversion reflection region, wherein the wavelength conversion reflection region and the non-conversion reflection region are located in a central region of the wavelength conversion wheel, and the wavelength conversion wheel comprises a first side and a second side that are opposite to each other;
the excitation light beam passes through an area beside the central region from the first side of the wavelength conversion wheel and then exits from the second side of the wavelength conversion wheel and is transmitted to the first mirror, and the first mirror is configured to reflect the excitation light beam to the central region located on the second side; and
the non-conversion reflection region is configured to reflect the excitation light beam, or the wavelength conversion reflection region is configured to convert the excitation light beam into a converted light beam and reflect the converted light beam, the excitation light beam that is reflected or the converted light beam that is reflected is transmitted to the light homogenizing element, and the light homogenizing element is configured to homogenize the excitation light beam and the converted light beam to form the illumination light beam.

12. The projection device according to claim 11, wherein the second side of the wavelength conversion wheel faces the light homogenizing element.

13. The projection device according to claim 11, wherein the wavelength conversion wheel further comprises an excitation light beam penetrating region disposed to surround a periphery of the central region, wherein the excitation light beam passes through the excitation light beam penetrating region from the first side of the wavelength conversion wheel and then exits from the second side to be transmitted to the first mirror.

14. The projection device according to claim 13, wherein the excitation light beam penetrating region is a hollow region or is disposed with a filter or a filter glass with an excitation light beam transmittance greater than or equal to 90%.

15. The projection device according to claim 11, wherein the non-conversion reflection region and the wavelength conversion reflection region alternately cut into a transmission path of the excitation light from the first mirror, wherein:
in a first time sequence, the non-conversion reflection region cuts into the transmission path of the excitation light beam and reflects the excitation light beam to the light homogenizing element; and
in a second time sequence, the wavelength conversion reflection region cuts into the transmission path of the excitation light beam, converts the excitation light beam into the converted light beam, and reflects the converted light beam to the light homogenizing element.

16. The projection device according to claim 11, wherein the illumination system further comprises a filter wheel, and the filter wheel comprises an excitation light beam filter region and a converted light beam filter region, wherein:
in a first time sequence, the excitation light beam filter region cuts into a transmission path of the excitation light beam, and the excitation light beam reflected by the non-conversion reflection region first penetrates the excitation light beam filter region and then is transmitted to the light homogenizing element; and
in a second time sequence, the converted light beam filter region cuts into a transmission path of the converted light beam, and the converted light beam reflected by the wavelength conversion reflection region first penetrates the converted light beam filter region and then is transmitted to the light homogenizing element.

17. The projection device according to claim 11, wherein the illumination system further comprises a light deflecting element, and the excitation light beam emitted from the excitation light source is first transmitted to the light deflecting element and then is transmitted to the area beside the central region of the wavelength conversion wheel.

18. The projection device according to claim 17, wherein the light deflecting element is a mirror or a curved lens.

19. The projection device according to claim 17, wherein a transmission direction of the excitation light beam between the excitation light source and the light deflecting element is neither perpendicular nor parallel to a normal line of a disc surface of the wavelength conversion wheel.

20. The projection device according to claim 11, wherein a center axis of the light homogenizing element is neither perpendicular nor parallel to a normal line of a disc surface of the wavelength conversion wheel.

* * * * *